United States Patent [19]

Takeuchi et al.

[11] 4,169,501

[45] Oct. 2, 1979

[54] AIRFLOW REGULATING APPARATUS FOR RADIATOR

[75] Inventors: Sadatoshi Takeuchi, Kawasaki; Osamu Kurihara, Yokohama, both of Japan

[73] Assignee: Kabushiki Kaisha Komatsu Seisakusho, Tokyo, Japan

[21] Appl. No.: 857,187

[22] Filed: Dec. 2, 1977

[30] Foreign Application Priority Data

Dec. 2, 1976 [JP] Japan .................. 51-160435[U]

[51] Int. Cl.² ............ F28F 13/06; B60K 11/04; F01P 11/12
[52] U.S. Cl. .................... 165/126; 123/41.49; 123/41.66; 165/135; 180/68 P; 181/224; 181/225; 181/238
[58] Field of Search ........... 165/135, 126, 138; 123/41.49, 41.66; 180/68 P; 181/198, 225, 283, 224, 238, 239

[56] References Cited

U.S. PATENT DOCUMENTS

| | | | |
|---|---|---|---|
| 3,762,489 | 10/1973 | Proksch et al. | 165/135 |
| 3,779,341 | 12/1973 | Huggins | 123/41.49 |
| 3,820,629 | 6/1974 | Carlson et al. | 165/135 |
| 3,897,850 | 8/1975 | Thompson et al. | 165/135 |

FOREIGN PATENT DOCUMENTS 2618203  11/1976  Fed. Rep. of Germany ........ 123/41.49

Primary Examiner—Sheldon Jay Richter
Attorney, Agent, or Firm—Armstrong, Nikaido, Marmelstein & Kubovcik

[57] ABSTRACT

An airflow regulating apparatus for a radiator having a suction fan driven by an engine comprising a radiator core defining passages for the liquid coolant from the engine, a radiator grille mounted on a vehicle frame on the upstream side of said radiator core, and a plurality of plates disposed longitudinally and laterally parallel to the airflow between said radiator core and said radiator grille, said plurality of plates thus forming lattices therebetween in such a manner that the density of the lattices is in proportion to the speed of air inflow thereto.

5 Claims, 5 Drawing Figures

AIRFLOW REGULATING APPARATUS FOR RADIATOR

BACKGROUND OF THE INVENTION

The present invention relates to an airflow regulating apparatus for a radiator for cooling the engine of a vehicle.

Water-cooled engines on vehicles are cooled by water circulating through the engine and a radiator where heated water from the engine is cooled down by air drawn through the radiator by a cooling fan. The air passing through the radiator flows at irregular speeds at various points in the radiator under the influence of the engine and other parts installed behind the radiator and because of varying sucking forces of the cooling fan. Frequently, a localized air speed through the radiator is increased up to one and a half times the average air speed and this has led to noises in the radiator.

SUMMARY OF THE INVENTION

It is therefore an object of the present invention to provide an airflow regulating apparatus for a radiator having a suction fan driven by an engine so as to improve heat exchange capacity of the radiator.

Another object of the present invention is to provide an airflow regulating apparatus for a radiator having a suction fan driven by an engine wherein noise caused by a local increase of airflow speed at the radiator can be minimized.

In accordance with the present invention, there is provided an airflow regulating apparatus for a radiator having a suction fan driven by an engine comprising a radiator core defining passages for a liquid coolant from the engine, a radiator grille mounted on a vehicle frame on the upstream side of said radiator core, and airflow regulating lattice means disposed between said radiator core and said radiator grille, said lattice means including a plurality of plates extending longitudinally and laterally parallel to the airflow wherein the density of said lattice means is in proportion to the speed of the air inflow to said lattice means so as to attain a uniform outflow speed of the airflow therefrom.

The above and other objects, features and advantages of the present invention will be readily apparent from the following description taken in conjunction with the accompanying drawings.

DESCRIPTION OF THE PREFERRED EMBODIMENTS

Figure 1:
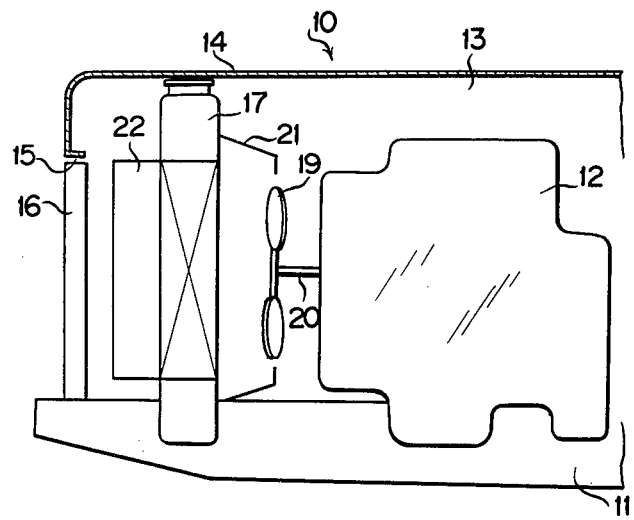
FIG. 1 is a schematic side elevational view partially in cross-section of a radiator arrangement equipped with an airflow regulating apparatus according to the present invention.

The present invention is particularly useful when embodied in a vehicle such as shown in FIG. 1 generally indicated by the numeral 10. The vehicle 10 includes a frame 11 which supports an engine 12 disposed in an engine compartment 13 that is defined partly by a hood 14. The hood 14 and the frame 11 jointly provide an opening 15 forward of the engine compartment 13, the opening permitting air to flow into the engine compartment 13 through a grille 16 mounted in the opening 15. The frame 11 also supports thereon a radiator 17 located between the grille 16 and the engine 12 and having a core 18 (FIG. 2) defining therein passages (not shown) through which a liquid coolant can flow from and to the engine 12 via conduits (not shown).

Between the radiator 17 and the engine 12, there is a suction cooling fan 19 disposed downstream of the radiator 17 and rotatable by the engine 12 through a shaft 20. The suction fan 19 is surrounded circumferentially by a shroud 21 mounted on the radiator 17 to provide better suction by the fan 19. An airflow regulating apparatus 22 is provided between the grille 16 and the radiator 17, the airflow regulating apparatus 22 being mounted on the radiator 17 and located upstream thereof. Thus inflowing air from the grille 16 passes through the airflow regulating apparatus 22 and the radiator 17 as the suction fan 19 is rotated by the engine 12.

Figure 2:
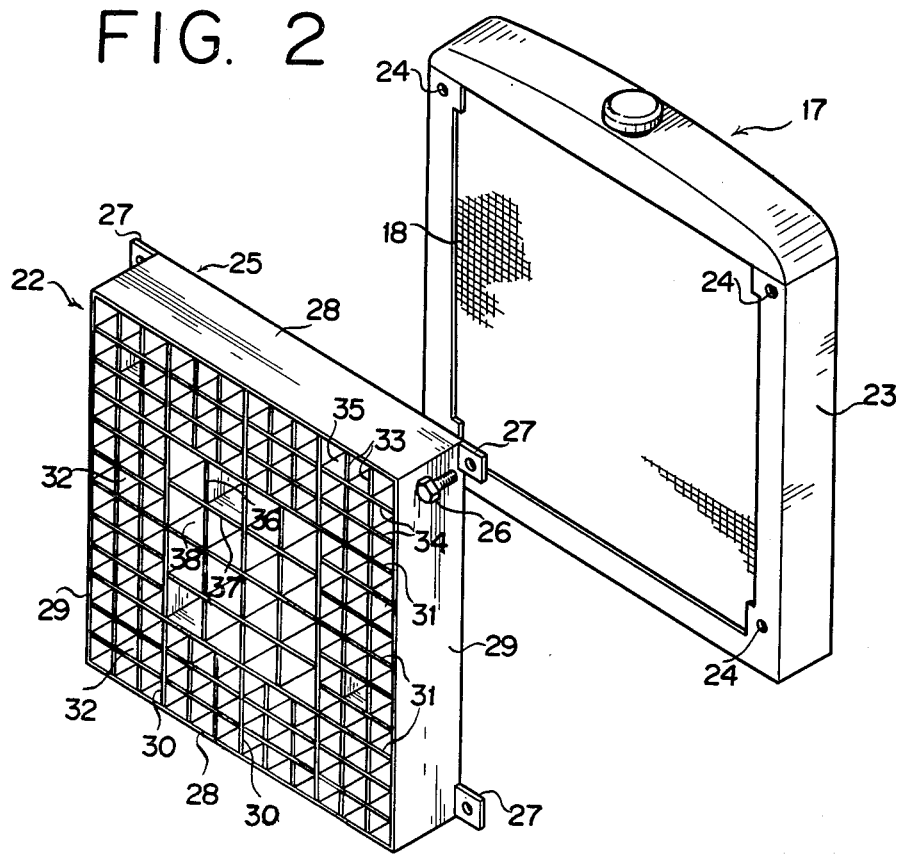
FIG. 2 is an exploded perspective view of an airflow regulating apparatus for the radiator according to the invention.

As shown in FIG. 2, the radiator core 18 is embraced peripherally by a rectangular frame 23 having pretapped holes 24 at its front corners. The airflow regulating apparatus 22 comprises an enclosure frame 25 which is substantially the same in size as the rectangular frame 23 of the radiator 17, the enclosure frame 25 being fixed to the radiator frame 23 by means of screws 26 extending through brackets 27 at the corners of the frame 23. The enclosure frame 25 includes a pair of spaced horizontal sidewalls 28,28 and a pair of spaced vertical sidewalls 29,29, each of the sidewalls extending perpendicularly to adjacent sidewalls.

The apparatus 22 has a lattice or grid structure comprising a plurality of vertical plates or partitions 30 spaced from each other and extending between the horizontal sidewalls 28,28, and a plurality of horizontal plates or partitions 31 spaced from each other and extending between the vertical sidewalls 29,29, the partitions 30,31 being equal in width to the sidewalls 28,29. The vertical and horizontal partitions 30,31 intersect one another and jointly provide a plurality of air channels 32 extending from end to end of the apparatus 25.

The air flowing into the radiator core 18 has different speeds of inflow at various points in the core 18 under the influence of the engine 12 and other parts located behind the radiator 17 and because of varying suction by the suction fan 19. More specifically, the inflowing air passing through the radiator core 18 near its periphery has a speed greater than that of the air drawn through a central portion of the radiator core 18. It has been experimentally found that assuming the suction fan 19 has a diameter D of rotation, air passing through the radiator core 18 within a circular range of about 2/5D disposed centrally of the core 18 has a speed of flow lower than that of air flowing through a portion outside the range. To compensate for the differences in airflow speed across the radiator core 18, each of those air channels 32 which are adjacent to the enclosure frame 25, or situated substantially outside the 2/5D range, has a pair of vertical subpartitions 33 and a pair of horizontal subpartitions 34, the subpartitions 33,34 crossing each other and jointly providing a plurality of first air passageways 35 in each air channel. Furthermore, each of those air channels 32 which are located centrally of the apparatus 22, or situated substantially inside the 2/5D range, and through which air flows at a lower speed has a vertical partition 36 and horizontal partition 37 which intersect each other and jointly provide a plurality of second air passageways 38 in each channel, each of the second air passageways 38 having a cross-sectional area greater than that of each first air passageway 35. The first and second air passageways 35,38 act to uniformalize the differing speeds of air flowing across and through the apparatus 22. More specifically, the first air passageways 35 which have the smallest cross-sectional area serve to prevent the sideways influx of air which would otherwise mainly cause the irregular airflow speeds across the radiator core 18.

Figure 3:
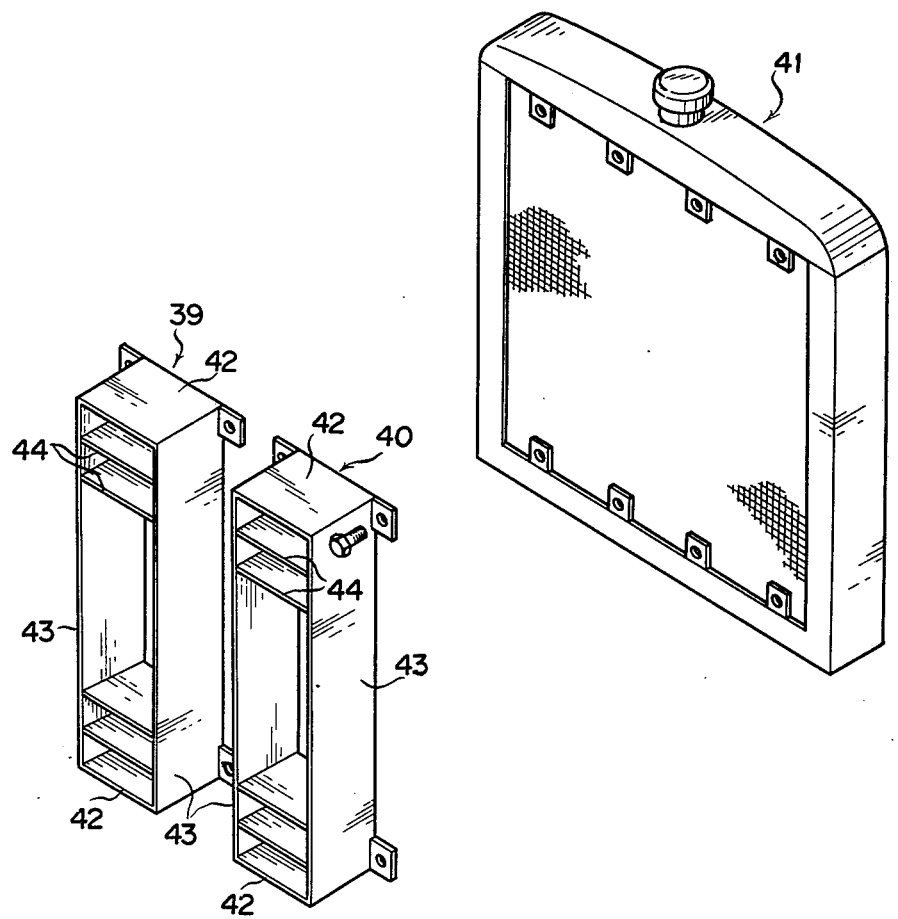
FIG. 3 is similar to FIG. 2 but showing another embodiment of the present invention.

FIG. 3 illustrates another embodiment in which a pair of airflow regulating units 39,40 are screwed to the front surface of a radiator 41. Each airflow regulating unit comprises an elongate rectangular frame including a pair of horizontal sidewalls 42,42, and a plurality of partitions 44 extending horizontally between the vertical sidewalls 43,43. The units 39,40 are installed at positions on the radiator 41 where air is assumed to be drawn through the radiator 41 at the maximum speed.

Figure 4:
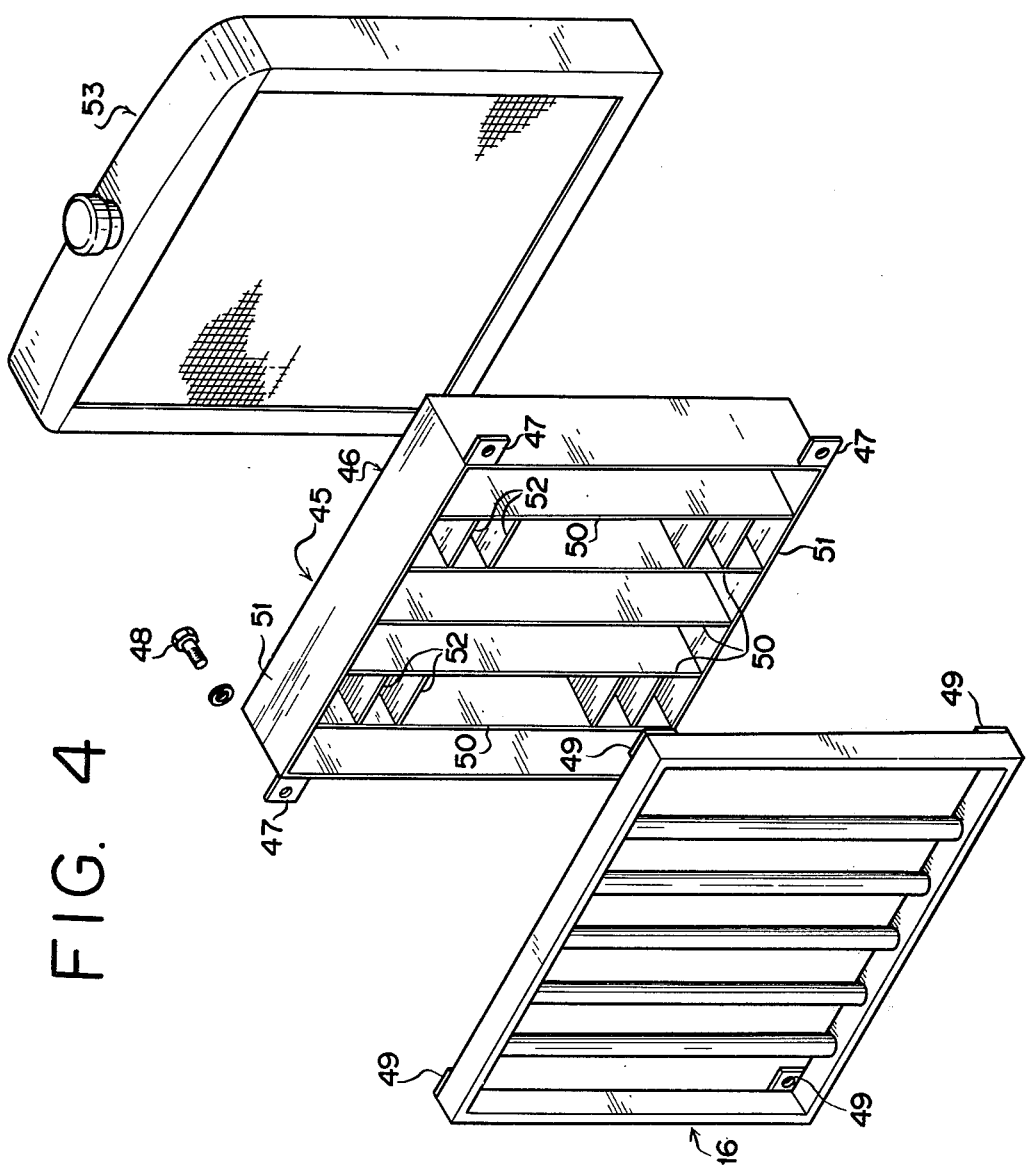
FIG. 4 is similar to FIG. 2 but showing still another embodiment of the present invention wherein an airflow regulating apparatus for the radiator is adapted to be mounted to a radiator grille.

According to still another embodiment shown in FIG. 4, an air flow regulating apparatus 45 comprises an enclosure frame 46 having corner brackets 47 which are secured by screws 48 to corner brackets 49 of the grille 16. The apparatus 45 includes a plurality of vertical plates or partitions 50 spaced from each other and extending between a pair of horizontal sidewalls 51,51 of the frame 46. A plurality of small horizontal partitions 52 are connected to and between a selected pair of adjacent vertical partitions 50 between which air inflow speed is expected to be the fastest. The airflow regulating apparatus 45 mounted on the grille 16 has its rear end disposed in contact with or adjacent to the front surface of a radiator 53.

Figure 5:
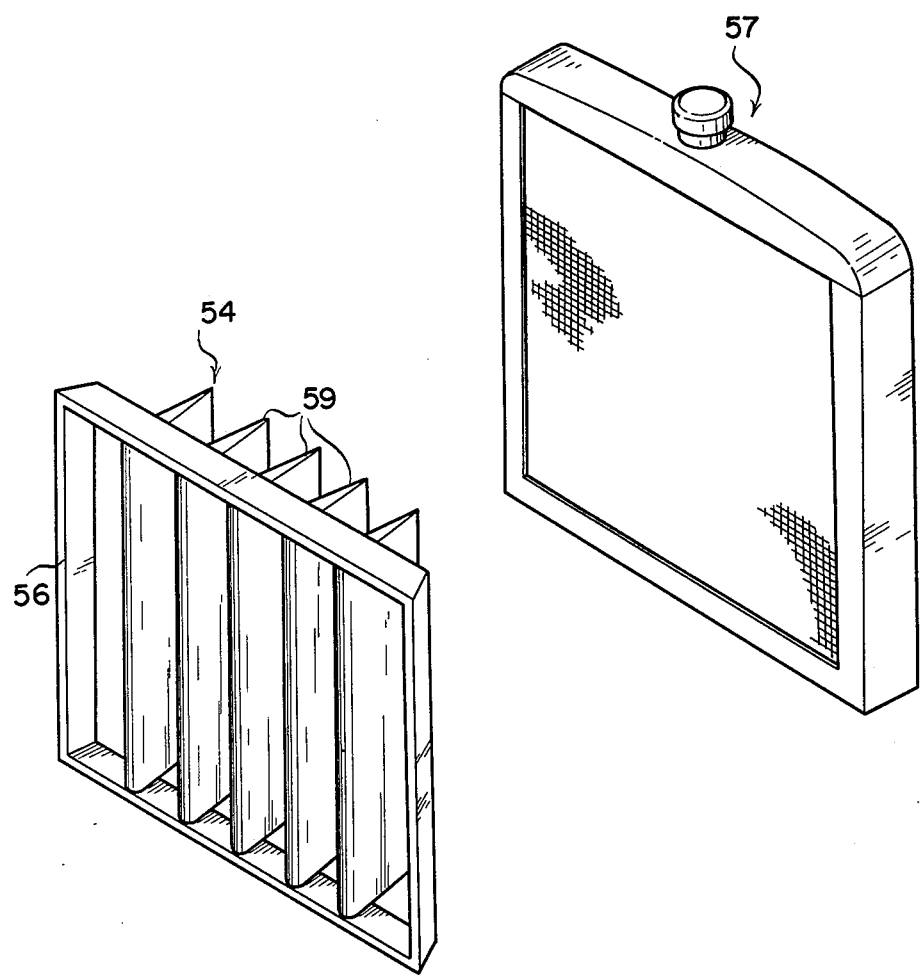
FIG. 5 is similar to FIG. 2 but showing a further embodiment of the present invention.

An airflow regulating apparatus 54 illustrated in FIG. 5 comprises a plurality of vertical blades 55 pivotally mounted in a frame 56, the blades 55 being spaced from each other and pivotable at their leading edges. The trailing edges of the blades 55 are located adjacent to and movable over the front surface of a radiator 57. The apparatus 54 is adjustable for a uniform speed of airflow to be discharged therefrom to the radiator 57 by moving closer the trailing edges of those adjacent blades 55 between which airflow speed is maximum and by moving apart the trailing edges of those adjacent blades 55 between which airflow flows at a lower speed.

Although various preferred embodiments have been shown and described, it should be understood that many other modifications and changes may be made without departing from the scope of the appended claims.

What is claimed is:

1. An airflow regulating apparatus for a radiator having a suction fan driven by an engine comprising a radiator core defining passages for a liquid coolant from the engine, a radiator grille mounted on a vehicle frame on the upstream side of said radiator core, and airflow regulating lattice means disposed between said radiator core and said radiator grille, said lattice means including a plurality of plates extending longitudinally and laterally parallel to the airflow, the density of said lattice means being low in and around the central part thereof and high at both side ends and upper and lower end regions thereof, whereby the density is in proportion to the speed of the air inflow to said lattice means so as to attain a uniform outflow speed of the airflow therefrom.

2. The airflow regulating apparatus as defined in claim 1 wherein low density region of said lattice means lies within about 2/5D from the center of said lattice means where D is the diameter of said suction fan.

3. The airflow regulating apparatus as defined in claim 1 wherein said lattice means is detachably mounted on said radiator core.

4. The airflow regulating apparatus as defined in claim 1 wherein said lattice means is detachably mounted on said radiator grille.

5. The airflow regulating apparatus as defined in claim 1 wherein said lattice means is divided into several units.

* * * * *